(12) United States Patent
Santos

(10) Patent No.: US 7,420,574 B2
(45) Date of Patent: Sep. 2, 2008

(54) SHAPE MORPHING CONTROL AND MANIPULATION

(75) Inventor: Sheila Marie Santos, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 665 days.

(21) Appl. No.: 10/826,201

(22) Filed: Apr. 16, 2004

(65) Prior Publication Data
US 2005/0231510 A1 Oct. 20, 2005

(51) Int. Cl.
G09G 5/30 (2006.01)
(52) U.S. Cl. ........................ 345/646; 345/473
(58) Field of Classification Search ................. 345/646, 345/473
See application file for complete search history.

(56) References Cited

U.S. PATENT DOCUMENTS

| | | | | |
|---|---|---|---|---|
| 5,252,953 | A * | 10/1993 | Sandrew et al. | 345/473 |
| 5,590,261 | A * | 12/1996 | Sclaroff et al. | 345/473 |
| 6,285,794 | B1 | 9/2001 | Georgiev et al. | |
| 7,170,508 | B2 * | 1/2007 | Ohno et al. | 345/419 |
| 2001/0040575 | A1 * | 11/2001 | Haga et al. | 345/473 |
| 2004/0012594 | A1 * | 1/2004 | Gauthier et al. | 345/473 |
| 2005/0156932 | A1 * | 7/2005 | Vienneau et al. | 345/473 |

OTHER PUBLICATIONS

S. Lee et al., "Image Metamorphosis with Scattered Feature Constraints," Dec. 1996, IEEE Transactions on Visualization and Computer Graphics, 2(4):337-354.

"Oscar-winning computer graphics pioneer reveals tricks in new course," Feb. 25, 1998, http://www.news.wisc.edu/wire/i022598/pkiv.html, 3 pgs.

Diana Schwartz, "Multimedia Production Tools. Elastic Reality Review Notes," Sep. 22, 1998, Apr. 13, 2004, http://www.multimedialibrary.com/Diana/Examples/Elastic/Elastic.html, 8 pgs.

Tim Daniel, "Avid's Elastic Reality," Mar. 1996, http://www.winnetmag.com/Articles/Print.cfm?ArticleID=2446, 7 pgs.

* cited by examiner

Primary Examiner—J. Amini
(74) Attorney, Agent, or Firm—Gates & Cooper LLP

(57) ABSTRACT

A method, apparatus, and article of manufacture provide the ability to manipulate an image transformation over time. A source image is selected from a first frame and a destination image is selected from a second frame. A first animation axis that defines a first two-dimensional transformation of the source image over time and a second animation axis that defines a second two-dimensional transformation of the destination image over time are both determined. The transformation of the source image to the destination image is manipulated by manipulating the second axis. Further, input from a user may be accepted for adjusting a coarseness of a lattice structure that controls an accuracy and affect of points with respect to each other during the transformation process. Lastly, the correspondence or mapping between sample points on the source and destination images may be manipulated over time.

29 Claims, 12 Drawing Sheets
(7 of 12 Drawing Sheet(s) Filed in Color)

SHAPE MORPHING CONTROL AND MANIPULATION

BACKGROUND OF THE INVENTION

1. Field of the Invention

The present invention relates generally to image processing systems, and in particular, to a method, apparatus, and article of manufacture for controlling and manipulating the warping or morphing of images.

2. Description of the Related Art

When processing and editing video images or frames (e.g., in the entertainment industry), a variety of technologies and tools may be used during editing and special effects processing. One type of technology is that of image metamorphosis (also referred to as morphing or warping). Image warping is the warping or distortion of a source image into a destination image. Such a distortion is enabled by applying 2D geometric transformations on the images to retain geometric alignment between features, while color interpolation blends their color. Image metamorphosis (or morphing) is the technique of slowly and smoothly deforming a source image from a front clip into a second destination image from a back clip (or vice versa). For example, a morphing operation may provide the ability to transform a young person into an elderly person, an animal into a person, or one object into another object. Thus, image morphing may utilize warping routines and operations to warp a first source image into the second destination image.

However, prior art morphing/warping applications fail to provide sufficient user control and manipulation capabilities to a user. Further, it may be difficult to perform a morphing/warping operation as images move in a scene. To more fully understand these disadvantages a more detailed description of morphing and warping may be useful.

Image morphing between a source and destination image may begin with establishing a correspondence between the images using primitives such as line segments, curves (splines), or points. Based on the correspondence, the spatial relationship between all of the points in both images are used to compute a mapping/warping function. Based on the mapping function, the two images may be said to be warped into alignment. The mapping may also be used to create intermediate/interpolated images that in turn enables the presentation (to a viewer/editor/user) of a smooth transition between the two images.

There are three important aspects in morphing: identifying feature sets, deriving a warp function, and deriving transition functions.

Identifying one or more features is important because it permits the user to identify those image landmarks that must remain in geometric alignment as the morph proceeds from the source image to the destination image. If features are not properly identified or matched properly, double-exposure artifacts common with cross dissolves (e.g., the fade-out of one image and the fade-in of another image) may be readily visible. For example, instead of a morphing operation, without selecting landmark features, the resulting video clip may appear merely as a cross-dissolve where the images do not appear to morph into each other. Examples of some common image landmarks that may be identified as a feature on a face may include a profile, eyes, nose, and mouth.

Features may be specified by identifying particular points, polylines, and curves. Feature/control points may then be identified from a specified feature by point sampling on the polyline or curve. The feature control points on the source image are then matched to corresponding feature control points on the destination image.

The warp function is the next important aspect in the morphing process. The warp function defines the smoothness or the interpolated/intermediate frames to be created between the source and destination images. If a warp function is rough, interpolated images may be distorted with discontinuities or abrupt deformations.

One prior art warp function is referred to as a free-form deformation (FFD). A FFD deforms an object by manipulating a lattice or grid containing the object. The manipulated grid determines a deformation function that specifies a new position for each point on the object. Thus, instead of manipulating the actual points on the object/image itself, the FFD allows the user to control the warp using control points (at the vertices of the grid) which affect the warp of the images.

The third aspect is that of transition control. Transition control defines the rate at which each pixel or points in the source image is transitioned or moved into the corresponding point on the destination image. By controlling the rate of transition for a particular feature, the morphing or warp of the image may appear more realistic or smooth. For example, the transition rate for the control points of a particular landmark feature (e.g., a nose) may be accelerated while other features may maintain a lower transition rate. Such a transition setting on a landmark feature may provide for a significant improvement in a morphing sequence and a more realistic appearing special effect.

In view of the above, the prior art identifies a three stage process for morphing/warping an image. First, features are specified in both a source image and a second image. These corresponding features are then matched to each other. The second step is to define the actual warp function that defines how each point in the source image transitions or moves into the corresponding point in the destination image. An FFD may be used to manipulate the points in this regard. The last step is defining the speed/rate at which the source point transitions to the destination point.

However, within the available prior art technologies, the user/video editor may lack the ability to interact intuitively with the editing software. Accordingly, what is needed is a video editing warping/morphing tool that allows the user to efficiently, easily, intuitively, and quickly control the morphing/warping process.

SUMMARY OF THE INVENTION

One or more embodiments of the invention provide a distortion/warping package/module that may be used to enhance the manipulation of the transformation from a source image to a destination image (and vice versa). One such enhancement is the use of an axis that defines a 2D transformation over time of a selected image/spline. To modify a transformation, a user merely needs to modify the axis associated with a particular spline instead of mapping all of the individual sample points as desired. When an axis is manipulated (e.g., rotated, scaled, or translated), all of the points of the spline are affected/warped in the accordance with the axis manipulation.

In addition to the use of an axis, embodiments of the invention may also allow the user to adjust and/or animate the lattice structure used to perform a free form deformation. The user may adjust the coarseness/fineness of the lattice structure thereby affecting the accuracy of a warping and the affect that the warp of a particular point will have on neighboring points. The coarseness of the lattice structure may also be animated over time such that the lattice structure may have different levels of coarseness at different points in time.

Further, one or more embodiments of the invention may permit the ability to manipulate and animate the correspondence between sample points (from a source to a destination image) over time. The user can opt to realign a sample point from a source image to a different destination image sample point at a particular point in time. Accordingly, the same sample point on a source image may be associated with multiple different sample points on a destination image at different points in time.

BRIEF DESCRIPTION OF THE DRAWINGS

The patent application or application file contains at least one drawing executed in color. Copies of this patent or patent application publication with color drawing(s) will be provided by the Office upon request and payment of the necessary fee.

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
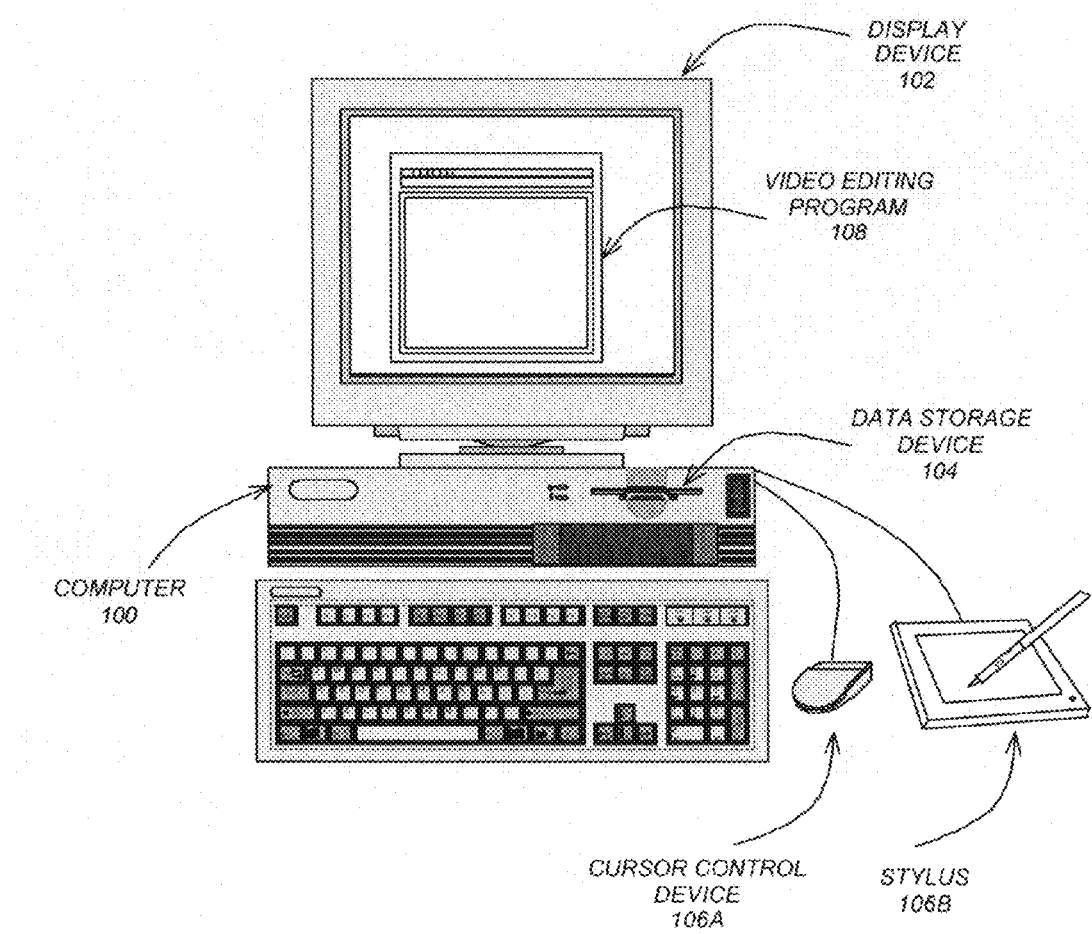
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106A, stylus 106B, and other devices. Those skilled in the art will recognize that any combination of the above components, or any number of different components, peripherals, and other devices, may be used with the computer 100.

One or more embodiments of the invention are implemented by a computer-implemented video editing program 108. Such a video editing program may be either linear or non-linear. The video editing program 108 is represented by a window displayed on the display device 102. Generally, the video editing program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Software Embodiments

The video editing program 108 may be used to provide a variety of editing modules. Each editing module may enable a plethora of particular editing functions or tools. An example of one such editing module is a distortion module provided in accordance with one or more embodiments of the invention. The distortion module may enable a warping or morphing tool. One or more embodiments of the invention may be encompassed within such warping or morphing tools and are described herein.

Image/Feature Selection

When morphing or warping an image, the user must first select a source image. One or more embodiments of the invention may create a spline (or a closed bezier curve) for the source image. A spline is a smooth curve that runs through a series of given points. The points of a spline may be defined by the user or automatically generated by the video editing software 108. Such a generation of points may also be referred to as point sampling.

Figure 2:
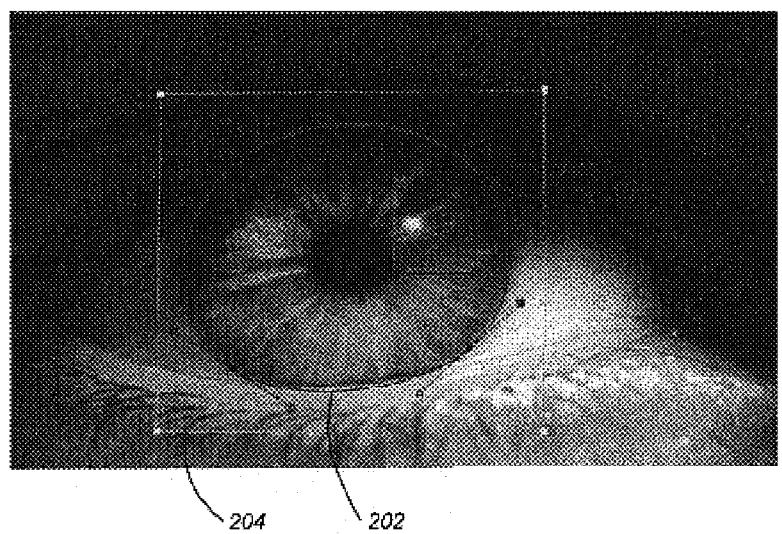
FIG. 2 illustrates the selection of two splines for use in a warping operation in accordance with one or more embodiments of the invention.

When a spline is created for a source image, an identical spline may also be created for the destination frame. Once each spline is edited, the difference between the source and destination splines is used to create the warp or morph operation. FIG. 2 illustrates two splines 202 and 204 that represent the source spline and destination spline. As illustrated, the source spline 202 comprises a circle surrounding the iris of an eye. The destination spline 204 (i.e., the desired shape of the source 202 after morphing) that has been created is a square. Thus, FIG. 2 illustrates the selection of a particular feature 202 of an image (i.e., the iris) to be warped into a square 204.

Axis-Based Warping Function

The next stage in the warping/morphing process is that of creating the warp function that defines the transformation of the source image 202 into the destination image 204. Various mechanisms may be used to create the warp function.

In accordance with one or more embodiments of the invention, an axis (also referred to as an animation axis) may be created that represents a 2D transformation of the source image over time. In this regard, the axis may be viewed as a representation or transformation of all of the points in a spline (that may be animated over time) and enables the ability for a user to easily warp all of the sample points of a source image using a simple tool. An axis may be used to rotate, scale, and translate the points of a source image/spline. In other words, an axis may be used to control the position, rotation, scale, and shear values of a spline.

Axes and splines are organized hierarchically such that each spline may have a parent axis. Further, a spline may have multiple parent axes. Each of the axes may be separately animatable over time to represent various transformations. The combination of all transformations for all of a spline's parent axes are used to warp/morph the spline.

To better view axes, splines, and their hierarchical structure, one or more embodiments of the invention enables the display of a graphical user interface that displays a schematic representation of the splines and axes. In addition, the schematic representation may be used to animate an axis (and thereby transform the axis' child spline).

Figure 3:
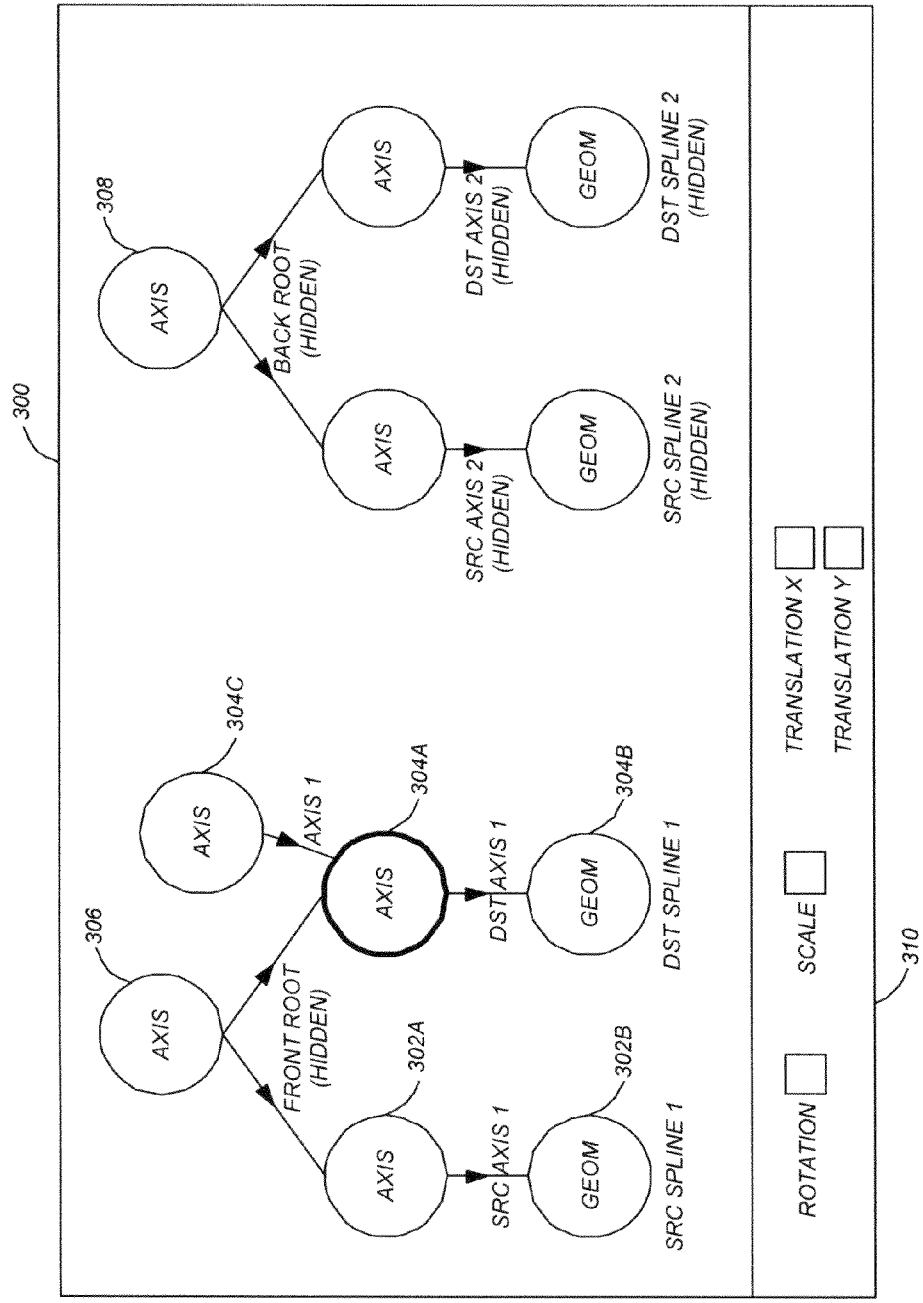
FIG. 3 illustrates an example of a graphical user interface displaying a schematic hierarchical view of images and associated animation axes in accordance with one or more embodiments of the invention.

FIG. 3 illustrates an example of a graphical user interface displaying a schematic view 300 in accordance with one or more embodiments of the invention. When a spline 202 or 204 is added, two nodes may be added to the schematic 300—an axis node (representing the transformation of the spline 202) and a geometric node (representing the actual spline 202 itself). For example, when the source spline 202 is added, the schematic may add an axis node 302A (depicted as SRC AXIS 1 in the schematic 300), and a geometric node 302B (depicted as DST AXIS 1 in the schematic 300). The geometric node 302B represents that actual spline 202. Similarly, when the destination spline 204 is added/selected, axis node 304A and geometric node 304B may be added. FIG. 3 also indicates that the destination spline 204 (represented as geometry 304B) has multiple parent axes—304A and 304C.

It should also be noted that the left half of the display in FIG. 3 represents the front clip, while the right side of FIG. 3 represents a back clip. Such a representation is illustrated by the "FRONT ROOT" notation that may be displayed under a front root axis 306 and a back root axis 308 (both of which may be hidden in the actual image screen (e.g., FIG. 2). Front clips and back clips are used to represent a morphing a process wherein an source image from a front clip is morphed into a destination image in a back clip and/or vice versa. A user can affect all of the source or destination nodes using a parent root node (e.g., the front root axis node 306 or back root axis node 308 respectively). FIG. 3 illustrates the schematic representation for a morphing process (i.e., a morph involving images from two different clips) and not a warping process (where an image/feature from a single clip is warped/distorted). However, the schematic may also be used to perform a warping process by merely working with the left side (or right side) of the display.

The axis nodes 302A and 304A may be used to rotate, scale, and/or translate the points from splines 302B and 304B respectively. A user may perform such a transformation in either the schematic view 300 or the image view (e.g., the view depicted in FIG. 2). To perform the transformation in the schematic view, the user may select a particular axis node (e.g., node 304A). The selection of a particular node may be indicated by changing the color or the node (e.g., yellow), changing the dimensions of the node, or changing the schematic representation of the node in any form desirable. In FIG. 3, the selection of axis node 304A is indicated by bolding the perimeter of the node 304A.

Once selected, various tools or properties may be displayed in graphical user interface 310. For example, the user may manually enter a rotational value, scaling value or X,Y scaling coordinates for the respective properties in interface 310. Alternatively, a slider, drop down box, radio button, or other user interface tool may be used to adjust the values of the selected node.

The geometric nodes 302B and 304B may be used to select the spline 302 and 304 itself, including all of the splines' points. Once selected, all of the points for the selected spine can be tracked. Alternatively, the selection of a node in the schematic view 300 may be reflected in a view where the splines are actually displayed (e.g., by modifying the color of a displayed spline, darkening the spline, or distinguishing the spline in any manner). In this regard, the selection of a spline 302B or 304B in the schematic view may assist the user in distinguishing a particular spline from many splines in a complex setup.

Figure 4B:
FIGS. 4A-4K demonstrate the use of an axis to modify a spline in accordance with one or more embodiments of the invention.
Figure 4A:
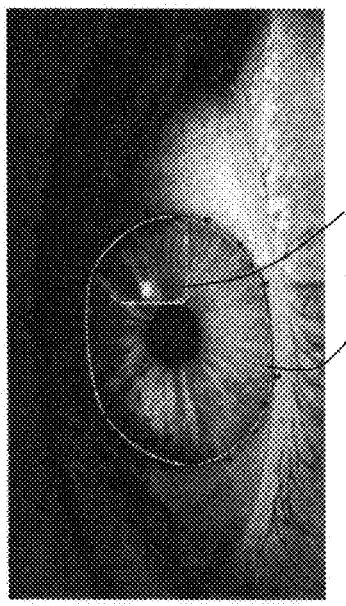
Figure 4C:
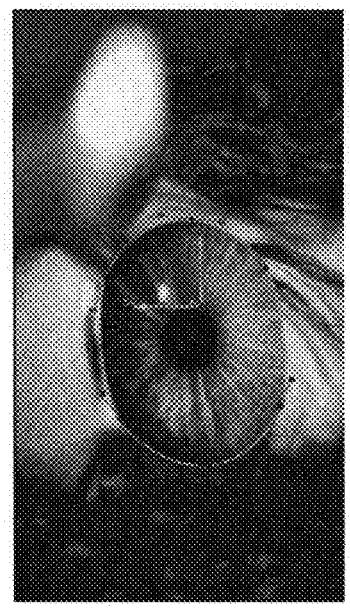
Figure 4E:
Figure 4G:
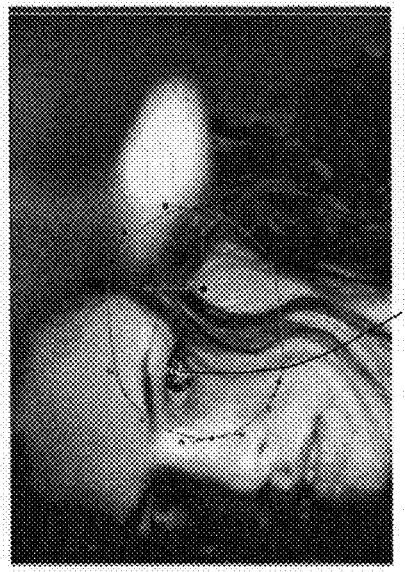

The use of an axis to modify a spline is demonstrated in FIGS. 4A-4K. FIG. 4A illustrates a front image with a source spline 302B around the iris of the eye to identify the feature/image to be warped. FIG. 4B illustrates the back image of a girl. The spline 304B in FIG. 4B is the destination spline for the front eye image and is therefore a duplicate of the front eye spline 302B. FIG. 4C illustrates the combined front and back images of FIGS. 4A and 4B without any warping. The desired user operation is to warp the eye of FIG. 4A to fit into the girl's left eye in the back image from FIG. 4B. Accordingly, the front eye image will be warped while the back girl image remains the same.

In the prior art, the points on source spline 302B and destination spline 304B could be modified. If the resulting splines were different, a warp would be performed to map the points on source spline 302B to destination spline 304B.

In one or more embodiments of the invention, the axis 304A parented to destination spline 304B may merely be transformed. The left side of the schematic of FIG. 3 illustrates the hierarchical relationship for the various axis and splines to be used to warp the eye. Examining FIG. 3, to perform the warp, the destination axis 304A merely needs to be modified/transformed.

Initially, a tracking operation may be performed to track the movement of the iris on the girl's face through several frames. Such a tracking operation may be performed using existing tracking techniques. The results of the tracking would produce a x and y position translation over time for the iris on the girl's face. The tracking could then be applied to the destination axis 304A such that the destination axis 304A follows the back image of the girl's left eye. The destination axis 304A may then be scaled down in x and y to match the scale of the girl's eye in the back image.

FIGS. 4D-4G show the animated axis 304A at frames 1, 4, 8, and 12 respectively. The destination axis 304A is animated in position x and y. Further, the destination axis 304A is also scaled x and y to fit the back image, but the scale is constant. FIGS. 4H-4K show the animated axis 304A at frames 1, 4, 8, and 12 where the scale of the axis 304A is modified over time, going from a 12% scale at frame 1 (FIG. 4H), to 100% at frame 12 (FIG. 4K).

Figure 4D:
Figure 4F:
Figure 4H:
Figure 4J:
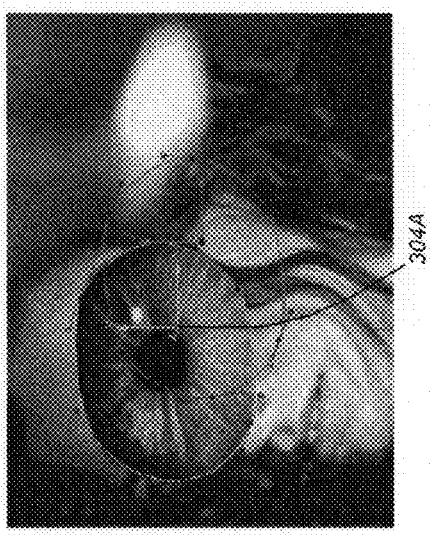
Figure 4I:
Figure 4K:
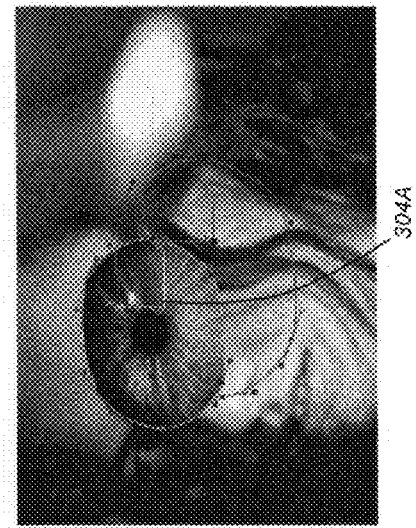

As illustrated in FIGS. 4D-FK, the destination axis 304A is displayed based on the scaling and may be manipulated by the user directly. Alternatively, the destination axis 304A may be manipulated in the schematic view 300 and interface 310. Once the axis 304 has been established, it may be applied to any other images/splines/sets of images as desired. In other words an axis 302A or 304A may be realigned with any other spline 302B or 304B as desired.

In addition to the above, a function may be used to add a point to the axis such that the axis is more flexible and easier to animate.

Thus, in accordance with one or more embodiments of the invention, a spline may be animated by applying data to the spline's axis or based on selected vertices according to reference points selected.

User-Specified Refinement for Free-Form Deformation

As described above, the warping/morphing process involves multiple stages. First, the features to be warped in both the source and destination image are selected. The various splines (that contain the features) may then be point sampled for use in creating a warp. It may be noted that as the number of point samples increases, the calculations for performing the warp increases (each additional point must be computed and considered during the warping process). The various points are then mapped to each other. Alternatively, the axis (as described above) for the source and destination may be used instead of the point mapping. Once the points are mapped to each other, the warp may be applied. However, various methods may be utilized for applying the warp and determining the resulting image and the intermediate images.

As part of the warp operation, various properties/parameters may be adjusted. In free-form deformations, a grid/mesh/lattice may be used to manipulate the points. However, the level of refinement of the grid (referred to as the coarseness or fineness of the grid) may determine how points are manipulated with respect to each other during the warp operation. In this regard, it should be noted that depending on the fineness of the grid, it may not be possible to move all of the source sample points to the desired location on the destination spline. One reason for such a limitation is that the displacement of a control point on a lattice may be based on the weighted average of the displacements required for moving its neighboring points. Another reason may be that the maximum displacement of a control point (on a lattice structure) may be limited to approximately half of the spacing between control points. Thus, if lattice structure is very coarse, the source spline may not be able to achieve the desired destination spline even when the warp is completed.

Figure 5E:
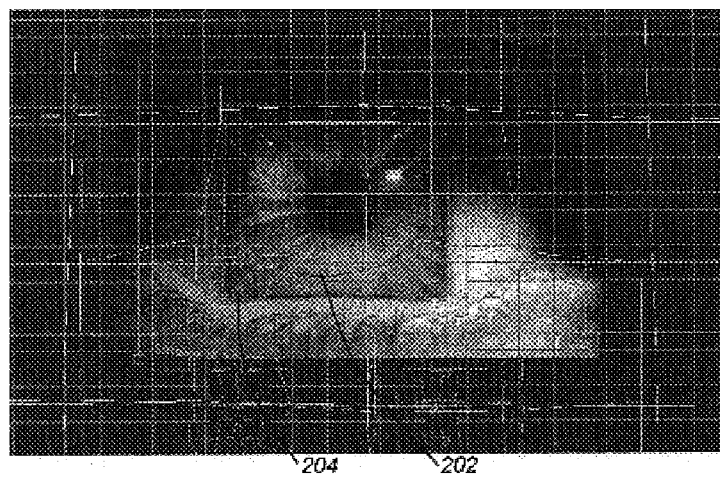
FIGS. 5A-5E illustrate the affect of a lattice structure having various levels of coarseness/subdivisions when attempting to perform a warping operation in accordance with one or more embodiments of the invention.
Figure 5A:
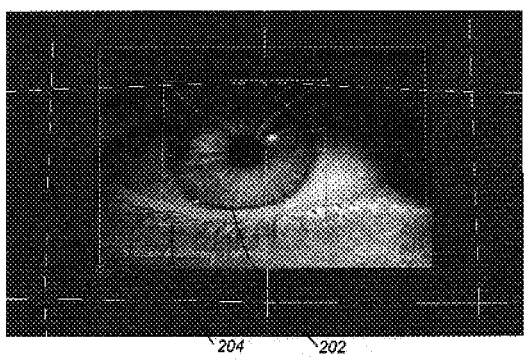
Figure 5B:
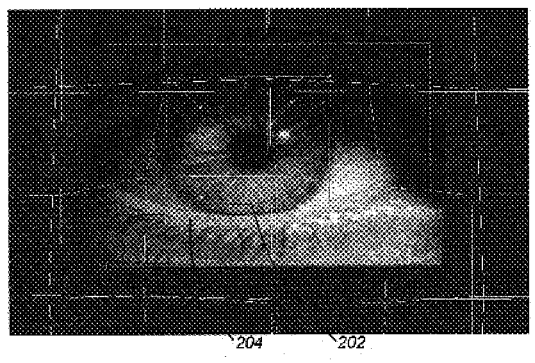
Figure 5C:
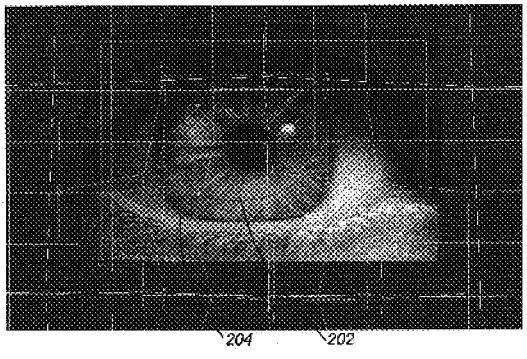
Figure 5D:
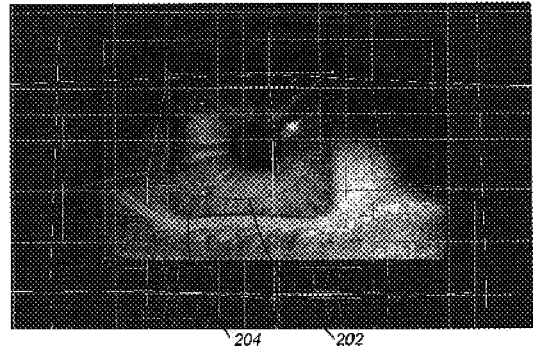

FIGS. 5A-5E illustrate the affect of a lattice structure having various levels of coarseness/subdivisions when attempting to perform the warping operation described with respect to FIG. 2. The number of subdivisions increases progressively from FIGS. 5A to 5E. As illustrated in FIG. 5A, the lattice structure is very coarse. Accordingly, when the warp is applied, the source spline 202 is unable to morph very noticeably to the destination spline 204. In FIG. 5B, the lattice structure is finer than that in FIG. 5A. However, while some slight morphing is visible, the lattice structure is not fine enough to permit the source spline 202 to effectively morph into the destination spline 204. The lattice structures increase in fineness from FIGS. 5C to 5E at which point it may be seen that the source spline 202 is able to fully morph into the square destination spline 204. It may also be seen that the various coarseness levels also affect how the points surrounding the destination spline 204 are affected. In this regard, FIG. 5E illustrates how the lower eyelid is affected by the morph operation. Such affects are due to the use of the lattice structure in applying the warp operation. As indicated above, the lattice structure determines how the movement of a control point in applying the morph affects other nearby points.

In view of the observations with respect to FIGS. 5A-5E, it becomes apparent that when you manipulate a fine lattice structure, there is an increase in accuracy with a decrease in the morph processing speed. Such a processing speed reduction is caused by the considerable increase in calculations that must be performed on the various control points that are part of the lattice structure. The increase in calculations results since each control point can only be moved a short distance (i.e., from one subdivision to the next subdivision). Accordingly, multiple movements (and calculations for each movement) are required to complete the morphing operation.

Thus, there is a tradeoff between speed and accuracy when performing a free from deformation. The issue then arises as to when to stop subdividing the lattice structure. Prior art techniques continue to subdivide the lattice structure until a particular numerical accuracy is obtained or until an error threshold is exceeded. For example, the lattice may be subdivided until each sample point is isolated such that the morph will only affect the sample point without affecting any other points. The problem with such a numerical accuracy or error threshold is that the lattice may continue to be subdivided beyond a necessary/noticeable point. Such excessive subdivisions trades off accuracy with processing speed. In addition, it may be undesirable. For example, it may be useful to move four points in the same direction. In such a situation, the lattice structure may only need to be subdivided until the four points are isolated together. Further, the prior art does not discuss continuity over time. Accordingly, the number of subdivisions may not change over time and may remain the same for all frames in a clip. In this regard, the calculated level of accuracy may work well with one frame but may not work well with other frames in a clip.

In accordance with one or more embodiments of the invention, the user is permitted to adjust/choose the number of subdivisions and thereby change the level of manipulation and fineness of the lattice structure. Such a user selection may be made by numerically specifying the number of subdivisions, altering a slider button, selecting from a list of available resolution levels, or any other means that enables the user to specify or select a fineness/coarseness of the lattice structure. By allowing the user to specify the fineness or resolution of a lattice structure, the user is provided with considerable flexibility and control over how a warping operation is conducted. Further, the user can easily adjust the fineness at various points over time thereby animating the resolution over time.

Point Sampling Correspondence Manipulation

As part of the warping/morphing process, sample points from the source spline are mapped to sample points on the destination spline. In the prior art, once mapped, the mapping is established for the remainder of frames in a clip. However, shapes/images are constantly moving over time and morphing with each other. In this regard, two shapes could be morphing into each other through intermediate/interpolated frames yet be moving independently of each other. The inability to modify the correspondence/mapping over time limits the capabilities of the user, the special effects that are possible, and may provide an undesirable result.

Figure 6A:
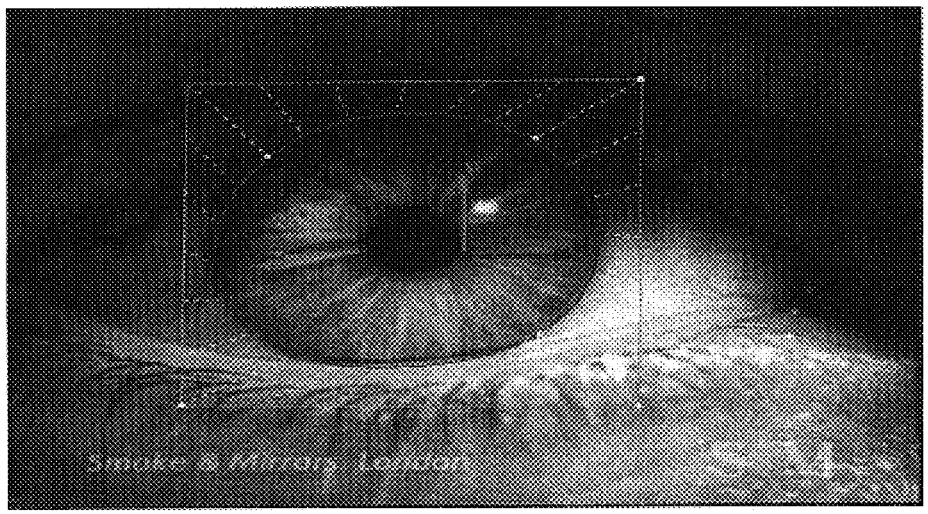
FIGS. 6A-6D illustrate the effect of animating a correspondence in accordance with one or more embodiments of the invention.

To overcome the limitations of the prior art, the present invention enables the ability to modify the correspondence between points over time. Accordingly, the correspondence/mapping is animated over time. FIGS. 6A-6D illustrate the effect of animating the correspondence. FIG. 6A illustrates the mapping of sample points on a source spline 602 with sample points on a destination spline 604 prior to applying a warp. There are four (4) points on both the source spline 602 and destination spline 604 that are clearly visible as small squares. Additional points in between the four visible points are also used in the mapping process. It is understood that the user may also adjust the number points selected for point sampling. Dashed lines connecting points on the source spline 602 and destination spline 604 indicate the correspondence or mapping between the various point samples around the two splines 602 and 604.

Figure 6B:
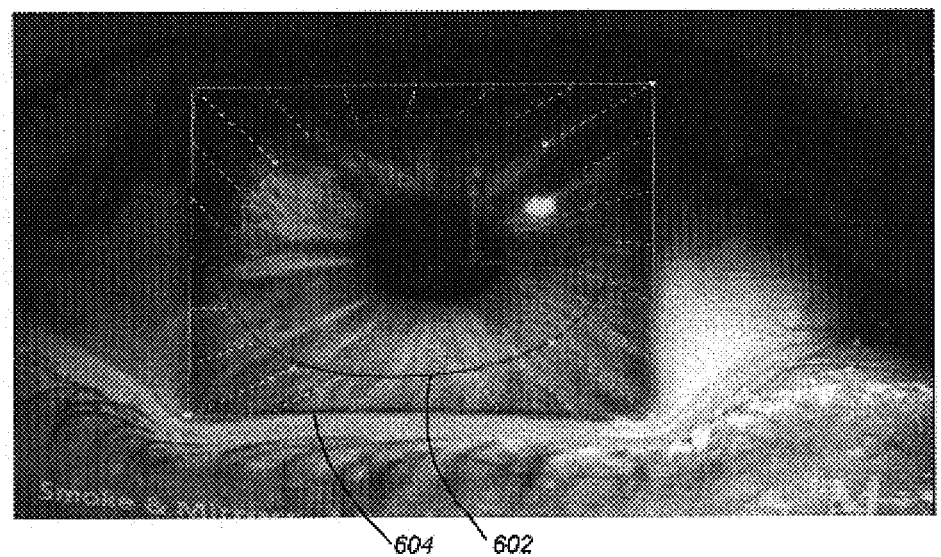

FIG. 6B illustrates the application of a warp with the correspondence remaining the same as in FIG. 6A. However, in accordance with embodiments of the invention, the user may freely modify the correspondence between points over time such that the warp from FIG. 6A to FIG. 6B may still occur while afterwards the correspondence may be modified. For example, the user can merely select a point on a timeline and then modify the correspondence between points on the source spline 602 and destination splines 604 for that particular point in time.

Figure 6C:
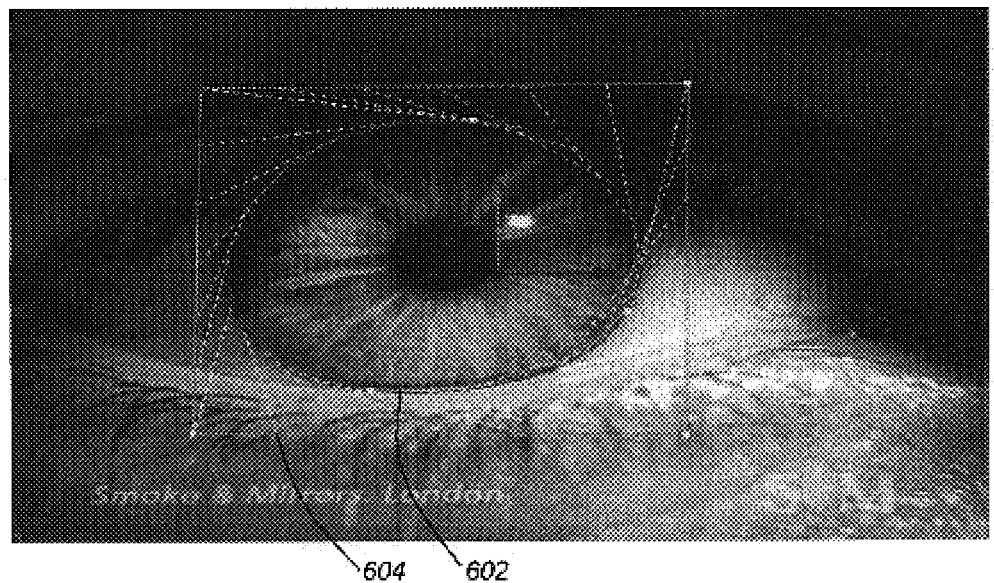
Figure 6D:
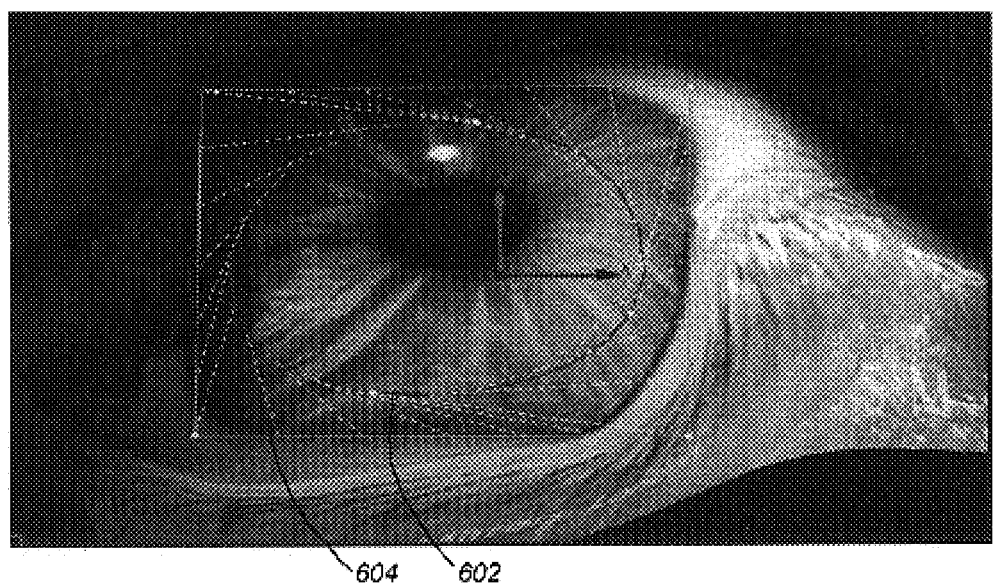

FIG. 6C illustrates how a user may change the correspondence between the source spline 602 and destination spline 604 from that established in FIG. 6A. As illustrated, the sample points on the source spline 602 are mapped to completely different points on the destination spline 604. FIG. 6D illustrates the application of the warp operation based on the new correspondence of FIG. 6C. As illustrated merely changing the correspondence alters the warp such that the eye now appears to twist. Additionally, the user can adjust the tangents to modify the warp affect.

Thus, over time, the user may establish two different mappings or correspondences for the same two splines 602 and 604 thereby animating the mapping and creating different warping effects for the images. Further, if a clip is pulled or shifted too much during a warping operation, the user may realign the clip merely by adjusting either the source or destination spline control points or tangent in reference to the correspondences that are displayed.

Logical Flow

Figure 7:
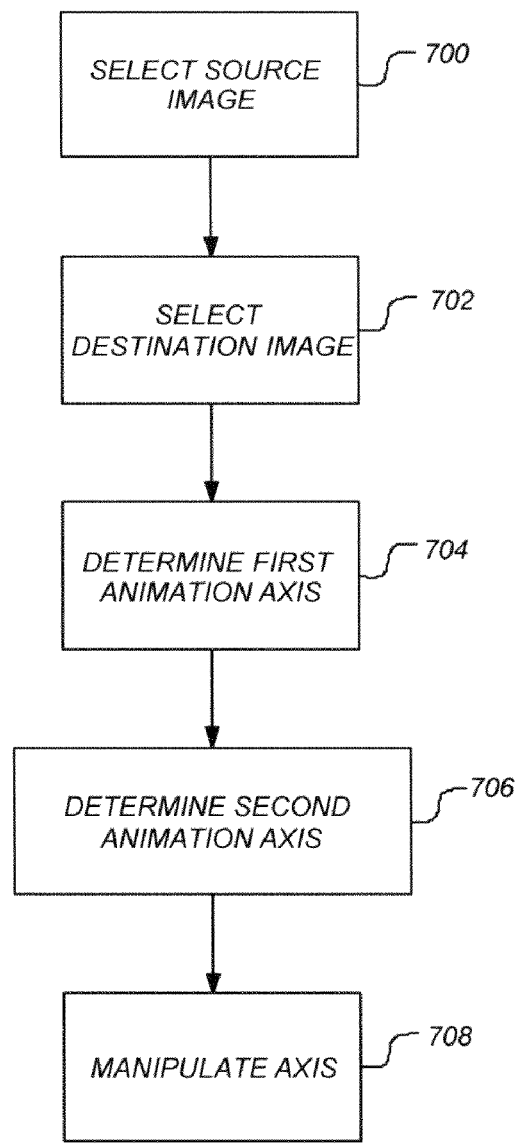
FIG. 7 is a flow chart illustrating the logical flow for manipulating a transform over time using an axis in accordance with one or more embodiments of the invention.

The above description presents various embodiments for manipulating an image transformation over time. FIG. 7 is a flow chart illustrating the logical flow for manipulating a transform over time using an axis. At step 700, a source image is selected from a first frame of a video clip. At step 702, a destination image, that the source image will transform into, is selected from a second frame of the video clip.

At step 704, a first animation axis that defines a first two-dimensional transformation of the source image in the video clip over time is determined. Similarly, at step 706, a second animation axis that defines a second two-dimensional transformation of the destination image in the video clip over time is determined. Further, multiple transforms may be represented in a single axis or in multiple different axes.

At step 708, the transformation of the source image to the destination image is manipulated by manipulating the second axis. Such manipulations may include rotating, scaling, or translating the axis thereby causing all of the points in the child image to warp in accordance with the manipulation. Further, the manipulation may involve realigning the axis with another image (e.g., the first axis with the destination image or the second axis with the source image).

Step 708 may be performed in a schematic hierarchical representation of the source image, the first axis, the destination image, and the second axis. In such a hierarchical representation, the first axis and second axis are parents of the source and destination images respectively. Further, the parent-child relationship is illustrated by displaying connectors and arrows between the first axis and its child—the source image, and the second axis and its child—the destination image. As described above, a particular image/spline may have multiple axes associated with it such that if any one axis is modified, it affects the warp of the image/spline. To perform the manipulation in the hierarchical representation, a particular axis may be selected and the properties of the axis may be modified.

Step 708 may also be performed directly by manipulating a graphical representation of an axis that is superimposed over the source or destination images.

Figure 8:
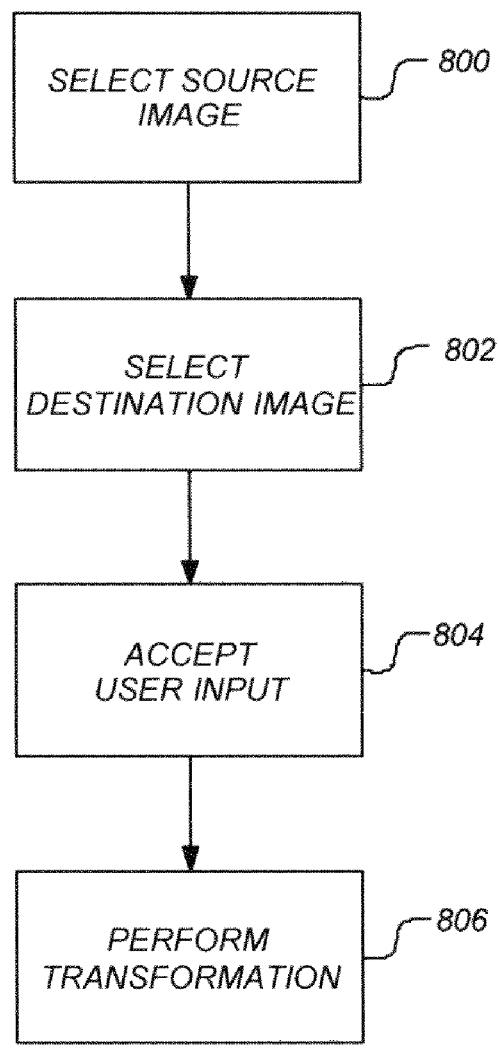
FIG. 8 is a flow chart illustrating the logical flow for manipulating an image transformation over time using a lattice structure in accordance with one or more embodiments of the invention.

FIG. 8 is a flow chart illustrating the logical flow for manipulating an image transformation over time using a lattice structure. At steps 800 and 802 source and destination images are selected form first and second frames of a video clip respectively. At step 804, user input for adjusting a coarseness of a lattice structure is accepted. Such user input may animate the lattice structure by adjusting the coarseness of a the lattice structure to different settings over time. The coarseness of the lattice structure controls the accuracy for performing the transformation. Similarly, the coarseness determines how sample points on the source image and destination image are manipulated with respect to each other during the transformation. At step 806, the transformation from the source to the destination is performed in accordance with the user specified coarseness.

Figure 9:
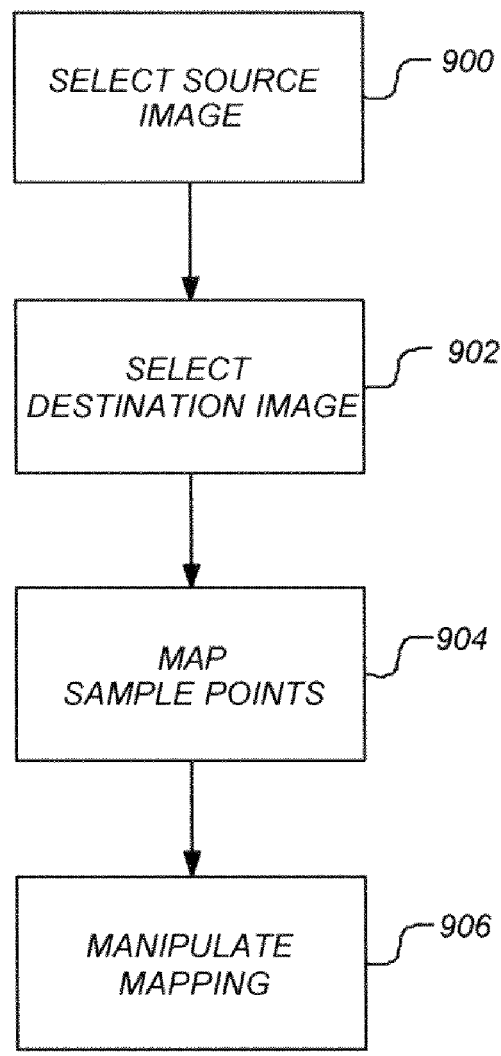
FIG. 9 is a flow chart illustrating the logical flow for manipulating an image transformation over time by manipulating a correspondence between sample points in accordance with one or more embodiments of the invention.

FIG. 9 is a flow chart illustrating the logical flow for manipulating an image transformation over time by manipulating a correspondence between sample points. At steps 900 and 902 a source and destination image are selected from a first frame and second frame of a video clip respectively. At step 904, a first sample point from the source image is mapped to a second sample point on the destination image. At step 906, the transformation of the source image to the destination image is manipulated by manipulating the mapping. Such manipulating may include modifying the mapping such that the mapping no longer connects the first and second point but connects the first point with a third point on the destination image. In addition, the mapping may be associated with a particular point in time such that the mapping may be animated over time. To animate the mapping over time, the first sample point is associated with a second point on the destination image at one point in time and is associated with a third point on the destination image at another point in time.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method fox manipulating an image transformation/metamorphosis over time, comprising:

selecting a source image from a first frame of a video clip by creating source spline for the source image, wherein the source spline comprises a first smooth curve that runs through a first series of given points;

determining a first animation axis that defines a first two-dimensional metamorphosis of all the given points in the source spline in the video clip over time;

selecting a destination image, that the source image will transform into, from a second frame of the video clip by creating a destination spline for the destination image, wherein the destination spline comprises a second smooth curve that runs through a second series of given points;

determining a second animation axis that defines a second two-dimensional metamorphosis of all the given points in the destination spline in the video clip over time; and manipulating a metamorphosis of the source image to the destination image by a user manipulating the second axis.

2. The method of claim 1, further comprising:

displaying a schematic hierarchical representation of the source image, the first axis, the destination image, and the second axis, wherein the first axis is a parent of the source image and the second axis is a parent of the destination image;

displaying a first connector, in the schematic representation, connecting the source image and the first axis; and displaying a second connector, in the schematic representation, connecting the destination image and the second axis.

3. The method of claim 2, wherein the manipulating is performed in the schematic hierarchical representation by:

selecting the second axis; and modifying properties of the second axis.

4. The method of claim 1, wherein the manipulating is performed by manipulating a graphical representation of the second axis that is superimposed over the destination image.

5. The method of claim 1, wherein:

the manipulating comprises rotating the second axis; and the rotating causes all of the points in the destination spline to warp in accordance with the rotation.

6. The method of claim 1, wherein:

the manipulating comprises scaling the second axis; and the rotating causes all of the points in the destination spline to warp in accordance with the scaling.

7. The method of claim 1, wherein:

the manipulating comprises translating the second axis; and the rotating causes all of the points in the destination spline to warp in accordance with the translating.

8. The method of claim 1, wherein the second transformation is defined by multiple two-dimensional transforms represented by multiple axis.

9. The method of claim 1, wherein the manipulating comprises modifying a point in the second axis to adjust the transformation to the destination spline.

10. The method of claim 1, wherein the manipulating comprises realigning the second axis with the source image.

11. A method for manipulating an image transformation over time, comprising:

(a) selecting a source image from a first frame of a video clip;

(b) selecting a destination image, that the source image will transform into, from a second frame of the video clip;

(c) accepting input from a user for adjusting a coarseness of a lattice structure, wherein:

(i) the coarseness of the lattice structure controls an accuracy for performing a transformation from the source image to the destination image; and (ii) the coarseness of the lattice structure determines how sample points on the source image and the destination image are manipulated with respect m each other during the transformation; and (d) performing the transformation of the source image to the destination image in accordance with the coarseness of the lattice structure; wherein the input from the user may animate the lattice structure by adjusting the coarseness of a lattice structure to different settings over time.

12. A method for manipulating an image transformation over time, comprising:

selecting a source image from a first frame of a video clip;

selecting a destination image, that the source image will transform into, from a second frame of the video clip;

mapping a first sample point from the source image to a second sample point on the destination image;

manipulating a transformation of the source image to the destination image by manipulating the mapping, wherein the manipulating comprises modifying the mapping from a first sample point on the source image to a third sample point on the destination image.

13. The method of claim 12, wherein the mapping is associated with a first point in time.

14. The method of claim 13, further comprising animating the mapping over time by mapping the first sample point from the source image to a third sample point on the destination point at a second point in time.

15. An apparatus for manipulating an image transformation/metamorphosis over time in a computer system comprising:

(a) a computer having a memory;

(b) a video editing application executing on the computer, wherein the video editing application is configured to:

(i) select a source image from a first frame of a video clip by creating a source spline for the source image, wherein the source spline comprises a first smooth curve that runs through a first series of given points;

(ii) determine a first animation axis that defines a first two-dimensional metamorphosis of all the given points in the source spline in the video clip over time;

(iii) select a destination image, that the source image will transform into, from a second frame of the video clip by creating a destination spline for the destination image, wherein the destination spline comprises a second smooth curve that runs through a second series of given points;

(iv) determine a second animation axis that defines a second two-dimensional metamorphosis of all the given points in the destination spline in the video clip over time; and (v) manipulate a metamorphosis of the source image to the destination image by a user manipulating the second axis.

16. The apparatus of claim 15, wherein the video application is further configured to:

display a schematic hierarchical representation of the source image, the first axis, the destination image, and the second axis, wherein the first axis is a parent of the source image and the second axis is a parent of the destination image;

display a first connector, in the schematic representation, connecting the source image and the first axis; and display a second connector, in the schematic representation, connecting the destination image and the second axis.

17. The apparatus of claim 16, wherein the video editing application is configured to manipulate through the schematic hierarchical representation by:

selecting the second axis; and modifying properties of the second axis.

18. The apparatus of claim 15, wherein the video editing application is configured to manipulate by manipulating a graphical representation of the second axis that is superimposed over the destination image.

19. The apparatus of claim 15, wherein:
the video editing application is configured to manipulate by rotating the second axis; and
the rotating causes all of the points in the destination spline to warp in accordance with the rotation.

20. The apparatus of claim 15, wherein:
the video editing application is configured to manipulate by scaling the second axis; and
the rotating causes all of the points in the destination spline to warp in accordance with the scaling.

21. The apparatus of claim 15, wherein:
the video editing application is configured to manipulate by translating the second axis; and
the rotating causes all of the points in the destination spline to warp in accordance with the translating.

22. The apparatus of claim 15, wherein the second transformation is defined by multiple two-dimensional transforms represented by multiple axis.

23. The apparatus of claim 15, wherein the video editing application is configured to manipulate by modifying a point in the second axis to adjust the transformation to the destination spline.

24. The apparatus of claim 15, wherein the video editing application is configured to manipulate by realigning the second axis with the source image.

25. An apparatus for manipulating an image transformation over time in a computer system comprising:
  (a) a computer having a memory;
  (b) a video editing application executing on the computer, wherein the video editing application is configured to:
    (i) select a source image from a first frame of a video clip;
    (ii) select a destination image, that the source image will transform into, from a second frame of the video clip;
    (iii) accept input from a user for adjusting a coarseness of a lattice structure, wherein:
      (1) the coarseness of the lattice structure controls an accuracy for performing a transformation from the source image to the destination image; and
      (2) the coarseness of the lattice structure determines how sample points on the source image and the destination image are manipulated with respect to each other during the transformation; and
    (iv) perform the transformation of the source image to the destination image in accordance with the coarseness of the lattice structure.

26. The apparatus of claim 25, wherein the input from the user may animate the lattice structure by adjusting the coarseness of a lattice structure to different settings over time.

27. An apparatus for manipulating an image transformation over time in a computer system comprising:
  (a) a computer having a memory;
  (b) a video editing application executing on the computer, wherein the video editing application is configured to:
    (i) select a source image from a first frame of a video clip;
    (ii) select a destination image, that the source image will transform into, from a second frame of the video clip;
    (iii) map a first sample point from the source image to a second sample point on the destination image;
    (iv) manipulate a transformation of the source image to the destination image by manipulating the mapping wherein the manipulating comprises modifying the mapping from a first sample point on the source image to a third sample point on the destination image.

28. The apparatus of claim 27, wherein the mapping is associated with a first point in time.

29. The apparatus of claim 28, wherein the video editing application is further configured to animate the mapping over time by mapping the first sample point from the source image to a third sample point on the destination point at a second point in time.

* * * * *